United States Patent
Mehalwal (10) Patent No.: US 11,481,953 B2
(45) Date of Patent: Oct. 25, 2022

(54) COMMAND PROCESSOR BASED MULTI DISPATCH SCHEDULER

(71) Applicant: Advanced Micro Devices, Inc., Santa Clara, CA (US)

(72) Inventor: Rohan Mehalwal, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/424,430

(22) Filed: May 28, 2019

(65) Prior Publication Data

US 2020/0380761 A1    Dec. 3, 2020

(51) Int. Cl.
| | |
|---|---|
| G06T 15/50 | (2011.01) |
| G06T 15/06 | (2011.01) |
| G06F 9/30 | (2018.01) |
| G06T 15/00 | (2011.01) |

(52) U.S. Cl.
CPC ......... *G06T 15/06* (2013.01); *G06F 9/30065* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 6,978,271 B1* | 12/2005 | Hoffman | ................. | G06F 16/13 |
| 9,304,777 B1* | 4/2016 | Schuttenberg | ........ | G06F 9/3836 |
| 2006/0155791 A1* | 7/2006 | Tene | .................... | G06F 12/0269 |
| 2006/0230259 A1* | 10/2006 | Ahmed | .................... | G06F 9/325 |
| | | | | 712/239 |
| 2010/0188396 A1* | 7/2010 | Mejdrich | .............. | G06T 17/005 |
| | | | | 345/419 |
| 2010/0299501 A1* | 11/2010 | McDonald | ............ | G06F 9/3816 |
| | | | | 712/208 |
| 2010/0313208 A1* | 12/2010 | Zarzycki | ................. | G06F 9/526 |
| | | | | 719/315 |
| 2012/0254472 A1* | 10/2012 | Ware | ........................ | G11C 5/02 |
| | | | | 710/3 |

(Continued)

OTHER PUBLICATIONS

Lee et al., Vectorized Production Path Tracing, Jul. 2017, ACM Proceedings of High Performance Graphics, pp. 1-11 (Year: 2017).*

(Continued)

*Primary Examiner* — Anh-Tuan V Nguyen
(74) *Attorney, Agent, or Firm* — Volpe Koenig (57) ABSTRACT

Described herein are techniques for performing ray tracing operations. A command processor executes custom instructions for orchestrating a ray tracing pipeline. The custom instructions cause the command processor to perform a series of loop iterations, each at a particular recursion depth. In a first loop iteration, a ray generation shader is executed that triggers execution of a trace ray operation. In any other iteration, zero or more shaders are executed based on the contents of a shader queue. Any shader may trigger execution of a trace ray operation. The trace ray operation determines whether a ray specified by the shader intersects a triangle. The ray trace operation places shader entries into a shader queue, at the current recursion depth plus 1. The command processor updates the current recursion depth based on whether a trace ray operation is executed. The loop ends when the recursion depth is less than a threshold.

21 Claims, 6 Drawing Sheets

(56) References Cited

U.S. PATENT DOCUMENTS

| | | | | |
|---|---|---|---|---|
| 2014/0028801 A1* | 1/2014 | Tin | ............... | G01B 11/2513 |
| | | | | 348/46 |
| 2016/0364830 A1* | 12/2016 | Deng | ............... | G06F 8/41 |
| 2016/0364831 A1* | 12/2016 | Spanton | ............... | G06F 9/4552 |
| 2018/0165786 A1* | 6/2018 | Bourd | ............... | G06T 15/005 |
| 2019/0236749 A1* | 8/2019 | Gould | ............... | G06F 9/4881 |
| 2020/0043218 A1* | 2/2020 | Vai | ............... | G06T 15/80 |
| 2020/0097293 A1* | 3/2020 | Havlir | ............... | G06T 1/20 |

OTHER PUBLICATIONS

Lee et al., SGRT: A Mobile GPU Architecture for Real-Time Ray Tracing, 2013, Proceedings of the 5th High-Performance Graphics Conference, pp. 109-119 (Year: 2013).*

* cited by examiner

COMMAND PROCESSOR BASED MULTI DISPATCH SCHEDULER

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for performing ray tracing operations on an accelerated processing device. A command processor receives commands from a host such as a central processing unit. The commands include commands to launch shader programs. The command processor is able to execute custom instructions for orchestrating a ray tracing pipeline. The custom instructions cause the command processor to perform a series of loop iterations, where each loop iteration is performed at a particular recursion depth. In a first loop iteration, a ray generation shader is executed. The ray generation shader triggers execution of a trace ray operation. In any other iteration, zero or more shaders are executed based on the contents of a shader queue that is filled by the trace ray operation. Any shader executed may trigger execution of a trace ray operation. The trace ray operation determines whether a ray specified by the shader intersects a triangle. The ray trace operation places shader entries (e.g., closest hit shader or miss shader) into a shader queue, at the current recursion depth plus 1. If a ray trace operation is executed in any particular loop iteration, then the command processor sets the current recursion depth as equal to the lesser of the current recursion depth plus 1 and the maximum recursion depth. If a ray trace operation is not executed in a particular loop iteration, the command processor decrements the current recursion depth. The loop ends when the recursion depth is less than a threshold (e.g., the base recursion depth, the depth at which the ray generation shader is executed). Additional details are provided below.

Figure 1:
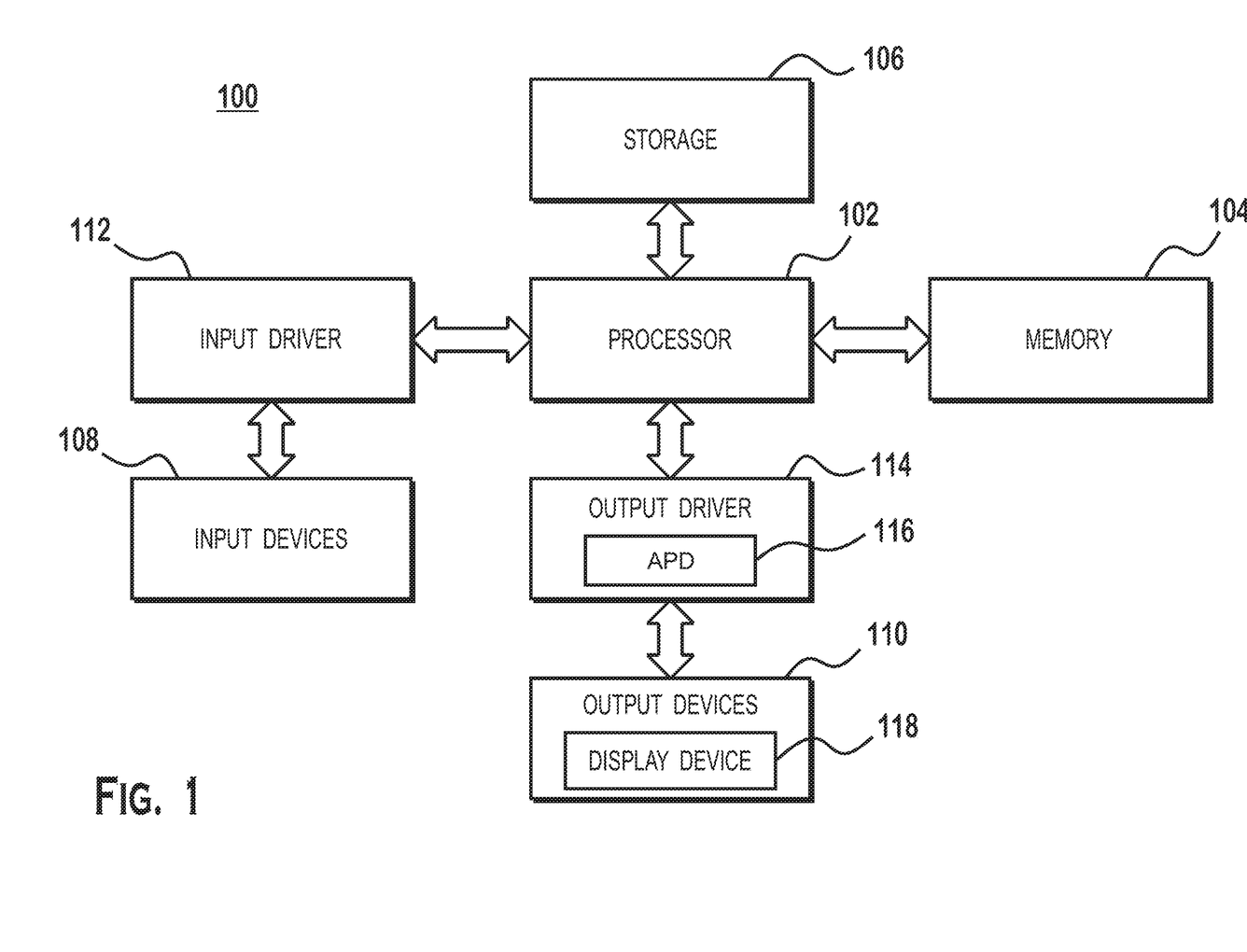
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
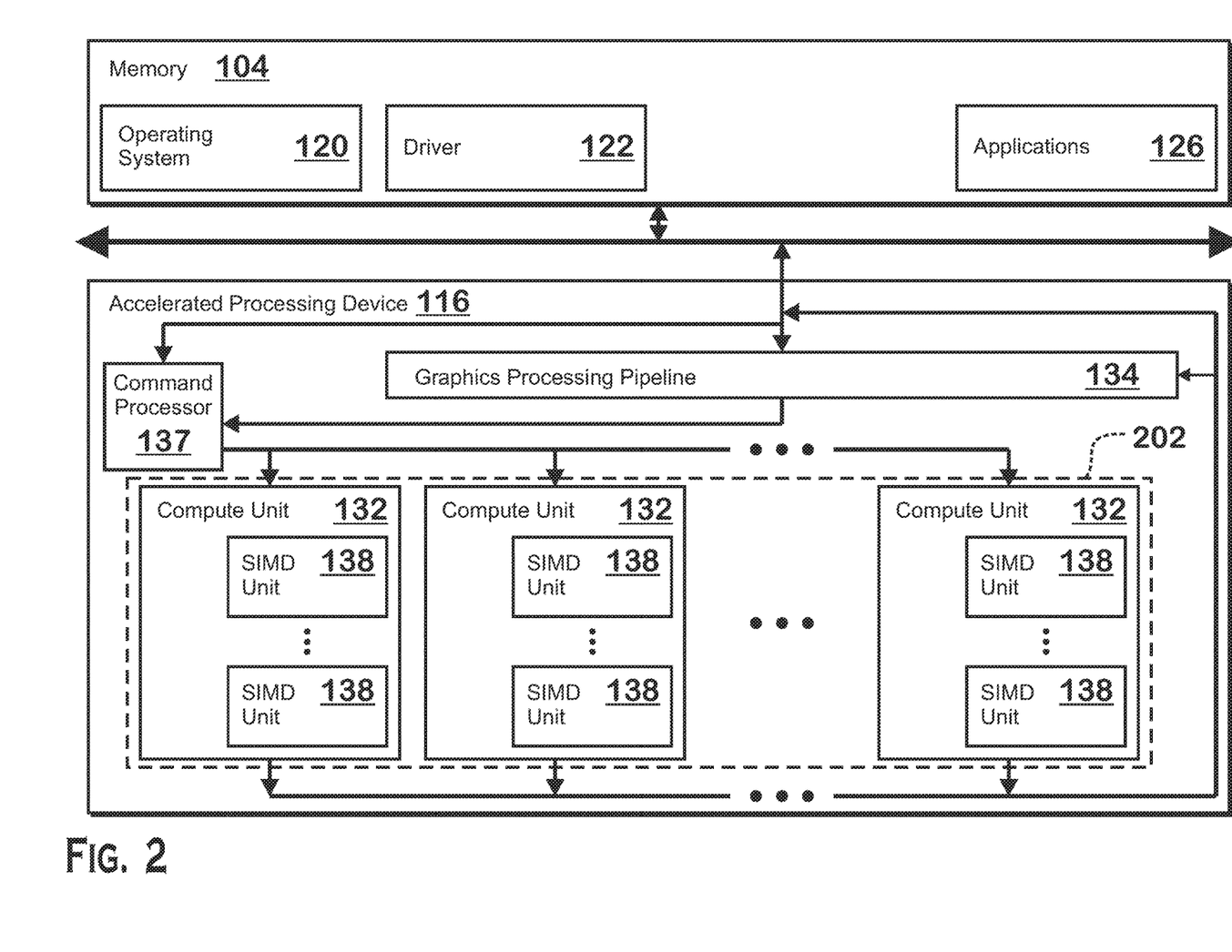
FIG. 2 is a block diagram of the device, illustrating additional details related to execution of processing tasks on the accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items may execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 137 generates one or more workgroups to execute that work. The number of workgroups, number of wavefronts in each workgroup, and number of work-items in each wavefront correlates to the size of work requested by the host. In some implementations, the host may specify the number of work-items in each workgroup for a particular request to perform work, and this specification dictates the number of workgroups generated by the command processor 137 to perform the work. As stated above, the command processor 137 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The accelerated processing device 116 implements ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
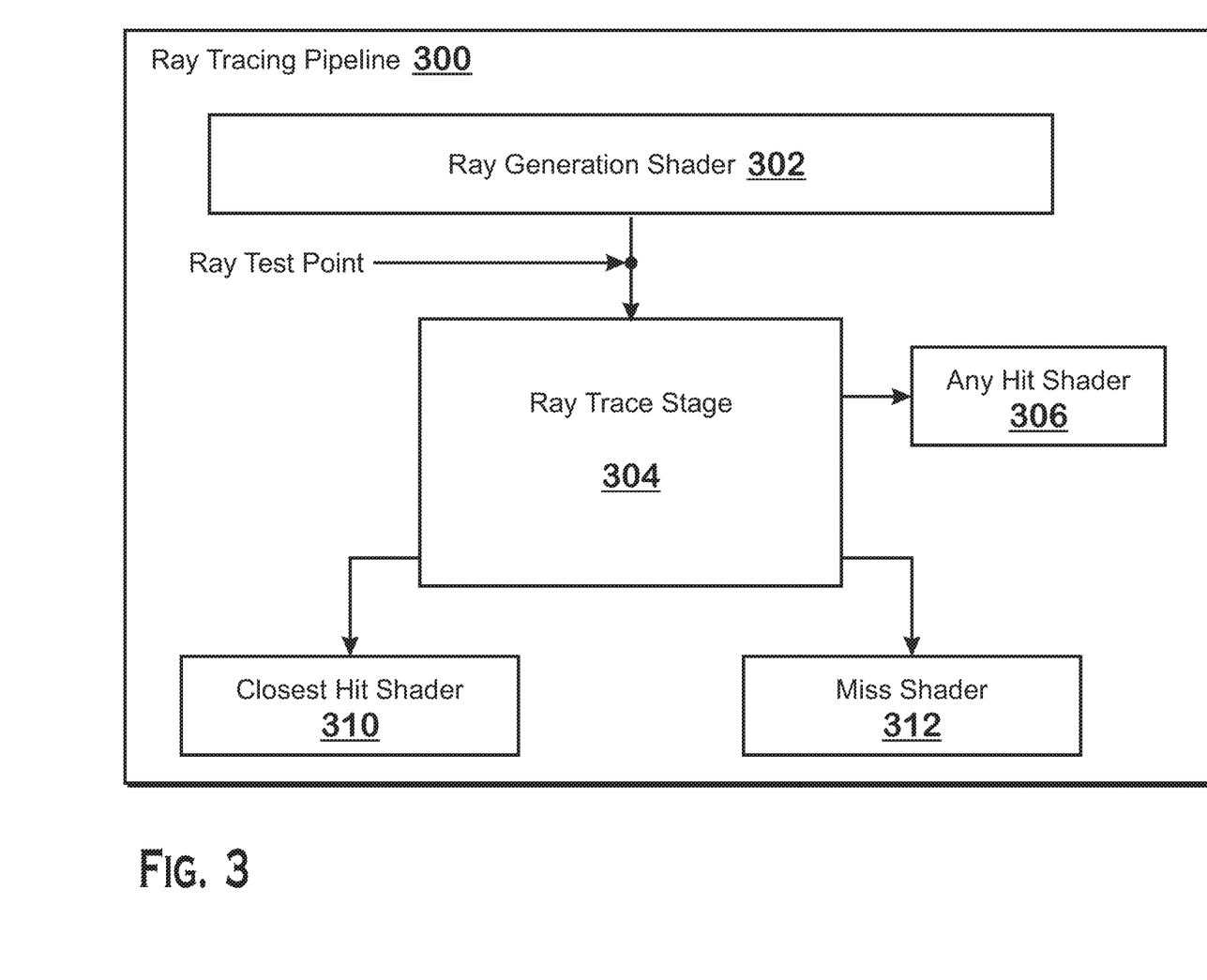
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD units 138. Any of the specific shader programs at each particular shader-implemented stage are defined by application-provided code (i.e., by code provided by an application developer that is pre-compiled by an application compiler and/or compiled by the driver 122). The ray trace stage 304 performs a ray intersection test to determine whether a ray hits a triangle. The ray trace stage 304 may be performed by a shader program executing in the SIMD units 138 or by fixed function hardware configured to perform ray intersection tests.

The various programmable shader stages (ray generation shader 302, any hit shader 306, closest hit shader 310, miss shader 312) are implemented as shader programs that execute on the SIMD units 138. The command processor 137 orchestrates execution of the ray tracing pipeline 300. Specifically, the command processor 137 is a programmable unit that executes instructions to cause the various stages of the ray tracing pipeline 300 to be performed on the APD 116. Additional details are provided elsewhere herein.

The ray tracing pipeline 300 operates in the following manner. One or more compute units 132 execute a ray generation shader 302. The ray generation shader 302 requests the ray trace stage 304 to perform one or more ray intersection tests. Each ray intersection test defines an origin and direction for a ray trace operation, which determines whether the ray hits one or more triangles or whether the ray does not hit any triangle.

The ray trace stage 304 identifies one or more triangles intersected by a ray for a ray intersection test, or, if no triangles are intersected by the ray up to a given distance, determines that the ray does not hit any triangles (i.e., that the ray "misses"). The ray trace stage 304 may be implemented in any technically feasible manner. In one example, the ray trace stage 304 is implemented as a shader program executing on one or more compute units 132. In another example, the ray trace stage 304 is implemented as fixed function hardware.

Ray trace stage 304 triggers execution of a closest hit shader 310 for the triangle closest to the origin of the ray that the ray hits, or, if no triangles were hit, triggers a miss shader. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point corresponding to a camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination (e.g., an average) of the colors determined for each of the rays of the pixel. Any particular ray generation shader 302 (or any other shader) may also specify that an any hit shader 306 is to be executed for any of the hits between a ray and a triangle, even if such hits are not the closest hit.

It is possible for the closest hit shader 310 and/or miss shader 312 to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color at the hit location to the pixel corresponding to the closest hit shader 310 that spawned the rays. It should be understood that although some examples of ways in which the various components of the ray tracing pipeline 300 can be used to render a scene have been described, any of a wide variety of techniques may alternatively be used.

It should be understood that any shader program written for the closest hit shader stage 310, miss shader stage 312, or any hit shader stage 306, may implement any of the operations described elsewhere herein as being performed by shader programs written for the ray generation stage 302. For example, in addition to spawning new rays to be provided to the ray test point for testing at the ray trace stage 304, such shader programs may specify whether misses or hits should spawn additional rays to trace (starting again at the ray test point), what shader programs to execute for any such additional rays, how to combine the color and/or luminosity values generated by such additional shader program executions, and any other operations that could be performed by a ray generation shader 302.

Herein, the spawning of additional rays by shader stages triggered by a shader program for the ray generation shader stage 302 is referred to as "recursion." The number of ray trace operations displaced from the ray generation shader stage 302 defines the "recursion depth" of a shader program. The ray generation shader stage 302 has a recursion depth of 0. Any shaders executed due to the ray trace operation requested by a ray generation shader stage 302 have a recursion depth of 1. Any shaders executed due to the ray trace operation requested by a 1-depth shader program have a recursion depth of 2, and so on. In an example, a ray generation shader program (recursion depth 0) launches a ray trace which launches a closest hit shader program (recursion depth 1). The closest hit shader program launches a ray trace which launches a miss shader program (recursion depth 2). The miss shader program does not launch any ray traces and is thus the deepest that this particular example goes. In some implementations, the ray tracing pipeline 300 implements a maximum recursion depth. With a maximum recursion depth set, the ray tracing pipeline 300 does not execute shader programs above the maximum recursion depth. In the above example, if the maximum recursion depth were 1, the last miss shader program would not execute.

Orchestrating the ray tracing pipeline 300 is not a trivial problem. It is possible for code executing in a processor external to the APD 116 (such as the processor 102, which may be a CPU) to orchestrate the ray tracing pipeline 300. A simple version of such code would launch every possible shader program at every recursion depth up to the maximum recursion depth, which would lead to overhead associated with launching shader programs that perform no work.

Figure 4:
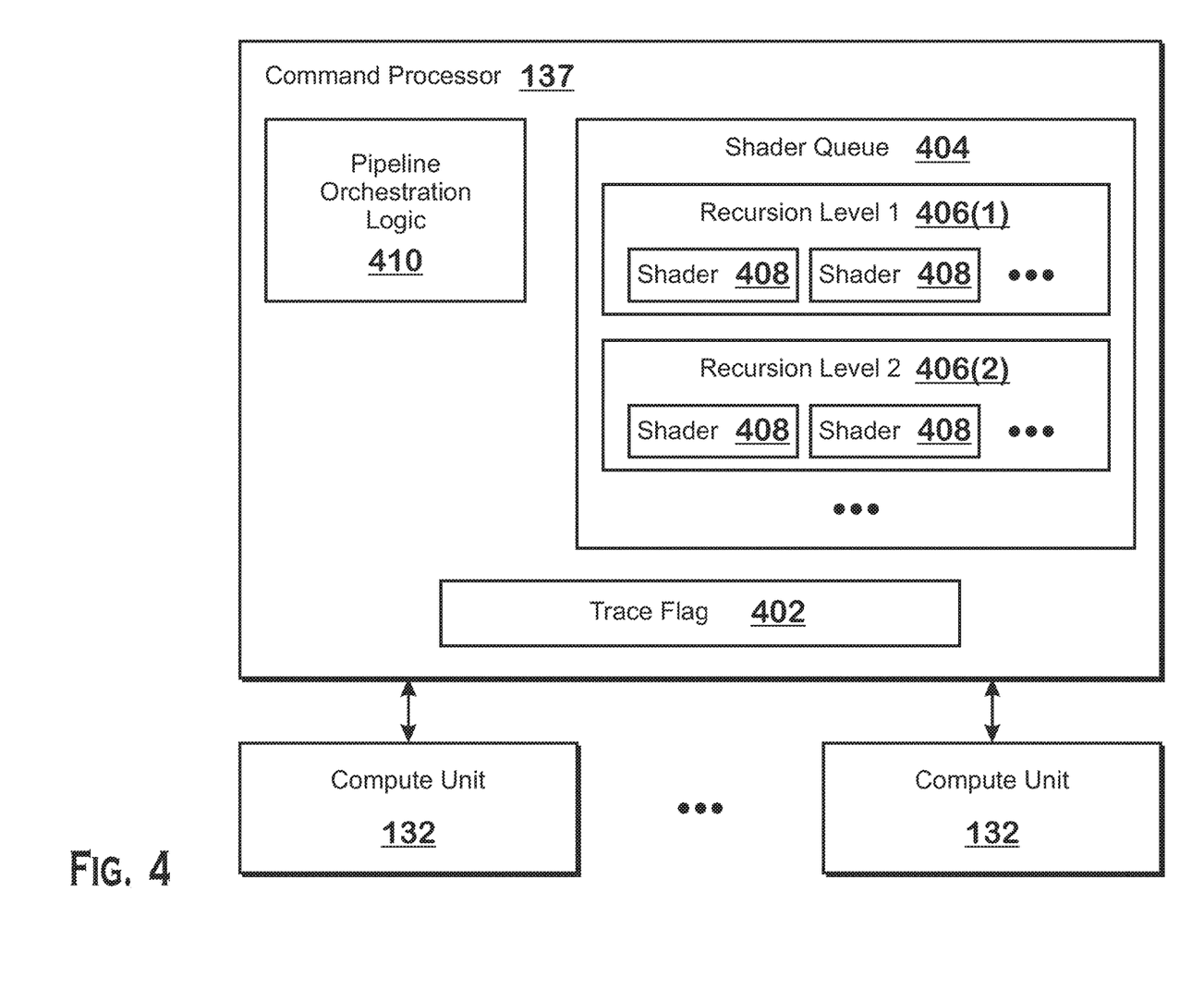
FIG. 4 illustrates aspects of the command processor related to orchestrating the ray tracing pipeline within the accelerated processing device, according to an example.

FIG. 4 illustrates aspects of the command processor 137 related to orchestrating the ray tracing pipeline 300 within the APD 116, according to an example. The command processor 137 includes pipeline orchestration logic 410 (which may also be referred to herein as a "pipeline orchestration unit" or "pipeline orchestration circuit") that performs operations to orchestrate operations of the ray tracing pipeline 300. Herein, where it is stated that the command processor 137 performs operations, such statements should be read to indicate that the pipeline orchestration logic 410 causes such operations to be performed. In an example, the pipeline orchestration logic 410 comprises computer instructions that execute on a microprocessor of the command processor 137. Such computer instructions cause the microprocessor to perform the steps described herein for orchestrating the ray tracing pipeline, which steps are described as being performed by the command processor 137. FIG. 4 also shows a trace flag 402 and a shader queue 404 within the command processor 137, although either or both of these elements may be located either within or external to the command processor 137. The command processor 137 triggers launching of workgroups to execute the different shader stages of the ray tracing pipeline 300, and is thus shown operatively coupled to the compute units 132.

To orchestrate the pipeline, the command processor 137 performs operations described by the following pseudo code:

TABLE 1

Ray Trace Pipeline Orchestration by Command Processor

```
void OrchestratePipeline ( )
{
    recursion_depth = 0;
    while (recursion_depth != -1)
    {
        clear_trace_marker (HasTrace) ;
        foreach shader in gpuShaderQueue
            shader.launch (recursion_depth) ;
        if (HasTrace)
        {
            trace.launch ( ) ;
            recursion_depth=min (recursion_depth+1,
                max_recursion_depth) ;
        }
        else
        {
            recursion_depth-- ;
        }
    }
}
```

The above pseudo-code describes the operations performed by the command processor 137 to orchestrate the ray tracing pipeline 300. The function OrchestratePipeline( ) represents the orchestration of one instance of a ray generation shader invocation by a host. More specifically, to render a scene, a host, such as the processor 102, will request a ray generation shader program to be launched at a given size (number of work-items). When the command processor 137 receives that request, the command processor 137 performs the operations represented by the OrchestratePipeline( ) function.

The command processor 137 sets the variable "recursion_depth" to 0, which corresponds to the recursion depth of the ray generation shader. The command processor 137 then enters into a while loop which ends when recursion_depth is equal to -1. In the while loop, the command processor 137 clears the trace marker variable called "HasTrace" (represented as the trace flag 402 in FIG. 4). The command processor 137 launches each of the shaders in the queue "gpuShaderQueue" (illustrated in FIG. 4 as the shader queue 404). gpuShaderQueue stores queues waiting to be launched at each recursion level. Initially, that is, in the first iteration of the while loop, gpuShaderQueue includes only the ray generation shader. Thus, in the first iteration of the while loop, the "foreach shader in gpuShaderQueue shader.launch (recursion_depth)" pseudo-code causes the command processor 137 to launch the ray generation shader.

Each shader program in the gpuShaderQueue is launched as a kernel. The term kernel means, for the ray generation shader, the number of work-items requested to be executed by the host (e.g., an application 126 executing on the processor 102), and for other shader programs, the number of work-items requested to be executed by whichever kernel triggered the execution of that other shader program. For example, if a ray generation shader program launched with 100 work-items launched a miss shader program, with 100 work-items, then a miss shader program kernel would constitute 100 work-items in that instance. In some modes of operation, the size of a kernel for any particular shader program is the same size as the kernel for the ray generation shader from which those shader programs ultimately descend. Thus for a ray generation shader kernel launched with 100 work items, any miss shader program, hit shader program, or any hit shader program kernel, launched as an ultimate result of the ray generation shader kernel, at any recursion depth, would also have 100 work items. It is possible, however, for the APD 116 (whether automatically in hardware or at the direction of an application-defined shader program) to "compact" shader programs other than the ray generation shader program, to reduce the performance impact of divergent control flow. Compacting means to reduce the size of a kernel based on the number of work-items that will actually perform useful work. In an example, a ray generation shader program is launched with 100 work-items. Of those 100 work-items, 50 rays result in a hit shader execution, and 50 rays result in a miss shader execution. In this instance, instead of executing each of the hit shader and miss shader kernels with 100 work-items, each is executed with only 50 work-items, so that the resources that would be used for the other 50 work-items are not consumed. The specific numbers of work-items described in this example should not be taken as limiting.

When the ray generation shader executes, the ray generation shader performs the operations specified by the ray generation shader program, which typically includes requesting a trace ray operation to be performed. To request the trace ray operation be performed, the ray generation shader sets the trace flag 402 ("HasTrace" in Table 1) and provides details about the ray (such as the origin and direction of the ray, the maximum distance from the origin of the ray at which a hit can occur, and which shader programs to execute at the miss shader stage 312, the closest hit shader stage 310, and/or the any hit shader stage 306) to the ray trace stage 304. After the ray generation shader finishes execution, the command processor 137 determines whether the ray trace flag 402 is set. If the ray trace flag is set, then the command processor 137 causes the ray trace stage 304 to perform the ray trace operations as specified to the ray trace stage 304 by the ray generation shader. Again, the ray trace operations involve testing a ray for intersection with triangles and triggering execution of appropriate shader programs as specified by the ray generation shader based on the ray intersection test results.

To trigger execution of a shader as the result of ray trace operations, the ray trace operations place entries in the shader queue 404 at the recursion depth equal to the current recursion depth plus 1. Thus, for the ray generation shader (which is recursion depth 0), the ray trace operations would place shader entries 408 into a data structure for recursion level 1 406(1). Shaders that execute in recursion level 1 in some instances trigger ray trace operations. Those ray trace operations would place shader entries 408 into a data structure for recursion level 2 406(2), and so on.

In addition to causing one or more trace operations to be launched, if the trace flag 402 is set, the command processor 137 sets the recursion_depth variable to the minimum of the recursion_depth+1 or the max_recursion_depth, which is the maximum recursion depth. In other words, the command processor 137 increments the recursion_depth variable if the recurison_depth variable is not already at the maximum recursion depth.

If the ray trace flag is not set (the "else" statement), which would occur if no shaders launched by the shader.launch (recursion_depth); statement request a ray trace operation, then the command processor 137 decrements the recursion_depth variable (recursion_depth—;). After the operations associated with the trace flag 402 being set or not set (the "if(HasTrace)" or the "else" statements), the iteration of the while loop ends and execution returns to the beginning of the while loop, where the command processor 137 determines whether the variable recursion_depth equals -1. If recursion_depth does not equal -1, then the contents of the while loop are performed again and if recursion_depth does equal −1, then the while loop is not performed again and OrchestratePipeline( ) ends. The recursion depth would equal −1 after the while loop returns to recursion_depth 0 and determines that there are no shader entries 408 in the shader queue 404 for recursion_depth 0.

In the description provided above, a shader program executes, requests a ray trace operation to be executed, and then ends. It is possible for any shader program to schedule post-trace operations for execution, where these post-trace operations constitute a "second" or "post-trace" portion of the shader program. The post-trace portion of the shader program would be treated as any other shader program, and would be launched as a kernel as described elsewhere herein, but in a logical sense, this post-trace portion of a shader program could be considered as a second (or subsequent) "part" of the shader program that executes after the ray trace operations and resultant shader program launches complete. For example, a programmer may desire to execute first ray generation shader operations, then execute a ray trace, and then execute second ray generation shader operations. The mechanism of scheduling the post-trace operations as a second shader program allows execution of the second ray generation shader programs, after the ray trace, to occur.

The post-trace portion of a shader program would occur after the command processor 137 recurses through the appropriate recursion depths and then returns to the recursion depth of the shader program that scheduled the post-trace operations for execution. In an example, a ray generation shader triggers a trace operation and places a post-trace portion of the ray generation shader as a shader entry 408 in the shader queue 404 at recursion depth 0 (the same recursion depth as the ray generation shader). Note that shader entries 408 placed into the shader queue 404 do not execute in the same iteration of the while loop as the shader that placed the shader entry 408 into the shader queue 404, even if the recursion depth of the new shader entry 408 is the same as the shader program that placed that shader entry 408 into the shader queue 404. In other words, if a ray generation shader (depth 0) places a post-trace portion of the ray generation shader into the shader queue 404 at recursion depth 0, then even though such an entry would be a shader at the current recursion depth, such entry would not be executed in the same iteration of the while loop that placed that shader entry 408 into the shader queue 404. Instead, the command processor 137 waits to execute such newly placed shader entries until at least one iteration of the while loop after the iteration of the while loop in which that shader entry 408 was placed into the shader queue 404. This waiting allows the post-trace operations to be executed after the ray trace operations and the resulting shader program launches.

The command processor 137 performs the operations described with respect to Table 1 for each ray generation shader kernel launch. In various implementations, the command processor 137 concurrently performs multiple iterations of these operations, each for a different ray generation shader kernel, to allow multiple ray generation shader kernels to launch concurrently in the APD 116. The command processor 137 may use any technically feasible mechanism for such concurrent execution, such as using multiple hardware execution units in the command processor 137, using preemptive multitasking, using a combination thereof, or using any other technically feasible technique.

It should be understood that in the description provided herein, functions described as being performed by the ray generation shader are also capable of being performed by any other shader, such as those that execute at the different stages of the ray tracing pipeline 300. In an example, a miss shader, any hit shader, or closest hit shader may place a shader entry 408 into the shader queue 404 for a second portion of that shader, to be executed at the same recursion depth, as with the ray generation shader. In another example, any of those shaders may request a trace ray operation to be performed, and may specify shader programs to execute at the miss shader stage 312, closest hit shader stage 310, or any hit shader stage 306.

Figure 5:
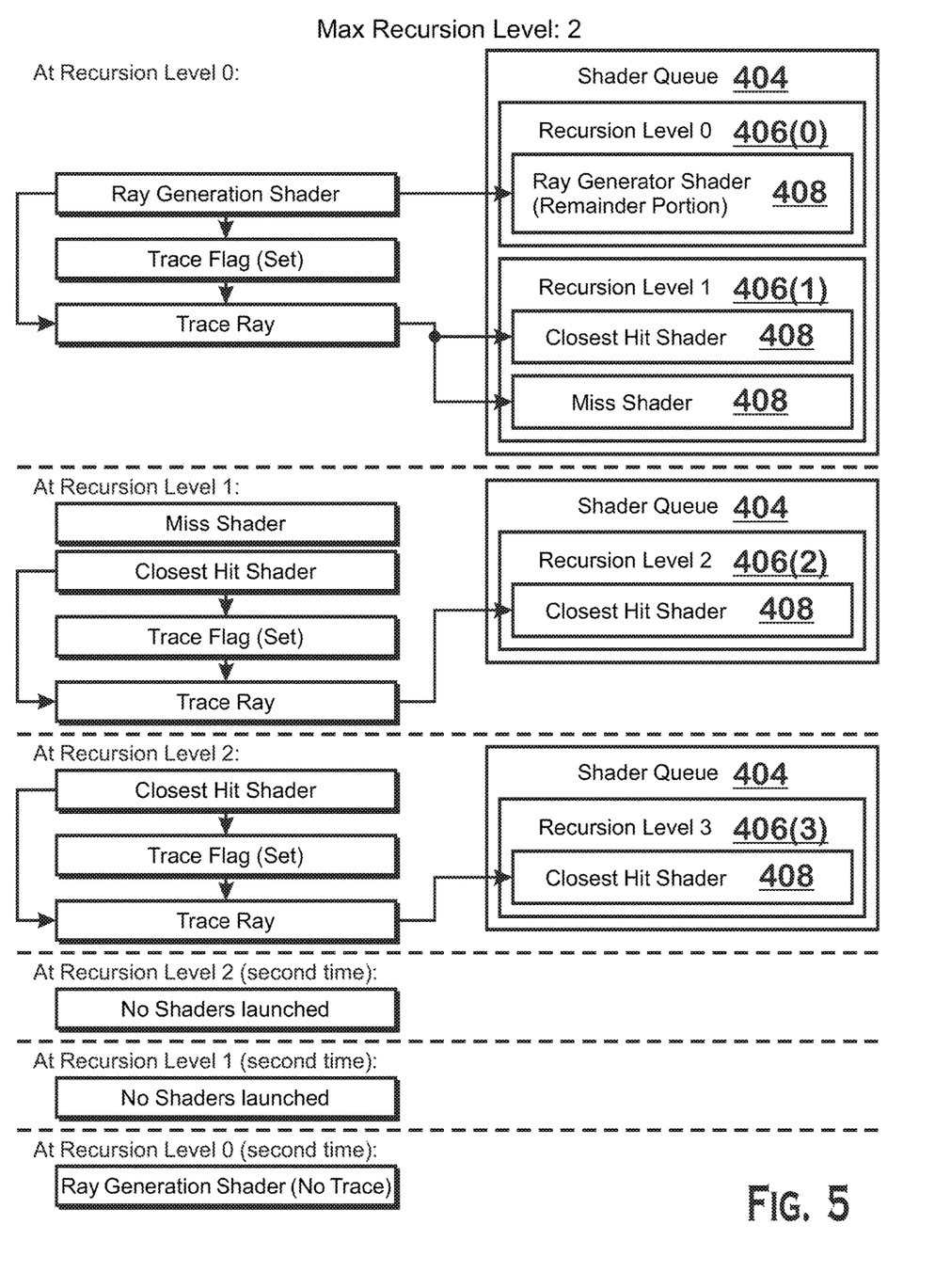
FIG. 5 illustrates an example sequence of operations performed by the command processor.

FIG. 5 illustrates an example sequence of operations corresponding to the operations described with respect to Table 1 being performed by the command processor 137. Each recursion level label ("at recursion level X") indicates a different iteration of the while loop, and these iterations are separated by dotted horizontal lines.

In the first iteration of the loop (recursion level 0), the command processor 137 causes the ray generation shader to be launched. The ray generation shader includes a request to perform a trace ray operation, so the ray generation shader sets the trace flag. Because the trace flag is set, the command processor 137 triggers a trace ray operation to begin. The trace ray operation determines that a closest hit shader kernel and a miss shader kernel should be executed and therefore places shader entries 408 in the shader queue 404 at recursion level 1. In addition, the ray generation shader places a shader entry for a post-trace portion (a "remainder portion") of the ray generation shader into recursion level 0, which will cause that remainder portion to execute after the trace ray and resulting shader programs execute. After the trace ray executes, the command processor 137 increments the recursion depth and moves to the next iteration of the loop, recursion level 1.

At recursion level 1, the command processor 137 triggers execution of the miss shader and closest hit shader, which are in the shader queue 404 at recursion level 1. The closest hit shader sets the trace flag, and requests the ray trace stage 304 perform a ray trace. Since the trace flag is set, the command processor 137 triggers execution of the ray trace stage 304, which determines that a hit occurs and thus places closest hit shader entries in the shader queue 404 at recursion level 2. Since a trace was executed, the command processor 137 increments the recursion depth and proceeds to the next iteration of the while loop at recursion level 2.

At recursion level 2, the command processor 137 triggers execution of the closest hit shader, which requests a trace operation to be performed and therefore sets the trace flag. The trace ray operation executes and determines that a closest hit shader should be performed, placing a corresponding entry into the shader queue 404 at recursion level 3. Since a trace ray operation was executed, the command processor 137 attempts to increment the recursion level, but since the recursion level is already the maximum recursion level of 2, the recursion level variable remains at 2 and the iteration of the while loop ends.

At the second recursion level 2 iteration of the while loop, because there are no shader entries 408 in the shader queue 404 at recursion level 2, the command processor decrements the recursion level and this iteration ends. At recursion level 1, the command processor 137 again decrements the recursion level variable. At recursion level 0, the command processor 137 launches the second portion of the ray generation shader, which has been sitting in the recursion level 0 406(0) portion of the shader queue 404. This remainder portion does not request a ray trace operation, and so the trace flag is not set. The command processor 137 decrements the recursion level. Because the recursion level is now −1, the command processor 137 ends this instance of the pipeline orchestration operation.

Figure 6:
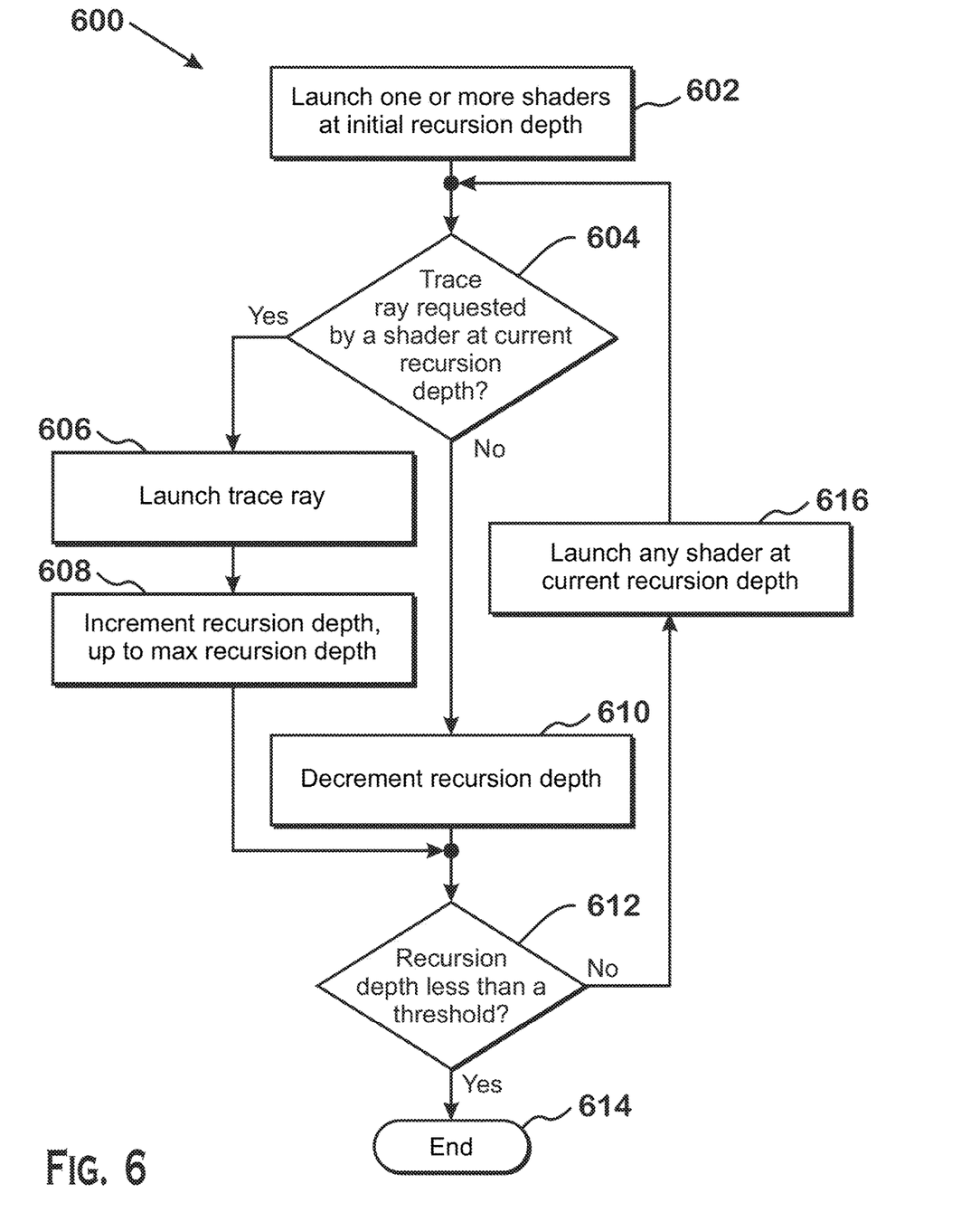
FIG. 6 is a flow diagram of a method for orchestrating a ray tracing pipeline, according to an example.

FIG. 6 is a flow diagram of a method for orchestrating a ray tracing pipeline, according to an example. Although described with respect to the system of FIGS. 1-5, the steps of the method 600 may be performed by any system, in any technically feasible order.

The method 600 begins at step 602, where the command processor 137 launches one or more shaders at an initial recursion depth. In an example, at the initial recursion depth, the shader that is launched is the ray generation shader. At step 604, the command processor 137 determines whether any of the shaders launched at the current recursion depth in the current loop iteration request a trace ray operation to be performed. If a trace ray operation is requested, then the method proceeds to step 606 and if no trace ray operation is requested by any shader launched at the current recursion depth in the current loop iteration, then the method 600 proceeds to step 610.

At step 606, the command processor 137 launches one or more trace rays requested by the shaders launched at the current recursion depth in the current loop iteration. As described elsewhere herein, any such trace ray operation may place shader entries 408 into the shader queue 404 at the next recursion depth (current recursion depth +1) based on the results of the trace ray. At step 608, the command processor 137 sets the recursion depth to the lesser of the maximum recursion depth or the current recursion depth +1.

At step 610 (arrived at if there are no shaders to execute at the current recursion depth at step 604), the command processor 137 decrements the recursion depth. At step 612, if the current recursion depth is below a threshold (e.g., current recursion depth=−1, and thus is less than a threshold of 0), then the method ends. If the current recursion depth is not below a threshold, then the method starts a new loop iteration and proceeds to step 616. At step 616, the command processor 137 examines the shader queue 404 and launches any shaders in the shader queue at the current recursion level, if any such shaders exist. After step 616, the method 600 returns to step 604.

As can be seen, in each loop iteration, the command processor 137 determines whether there are any shaders to launch for the current recursion level, launches those shaders if they exist, launches trace rays if requested by launched shaders, modifies the recursion depth based on the maximum recursion depth and whether a trace ray was requested, and checks whether the current recursion depth is below a threshold to determine whether to end the ray tracing pipeline orchestration. In a first loop iteration, the shader to launch will be the ray generation shader and thus a trace ray will be requested in the first iteration of the loop. Herein, the recursion depth at which the ray generation shader is launched may be referred to as a "base recursion depth." As described elsewhere herein, in some instances, trace ray operations place shader entries into a shader queue 404, where the shader entries indicate what shaders to execute at a subsequent recursion depth. In an example, the ray generation shader specifies that if the ray trace operation detects a hit, a closest hit shader should be executed to identify a color value for a pixel associated with that ray. In this example, the closest hit shader dictates that an additional ray should be traced from the point of that closest hit, in order to identify additional contributions to the color of the pixel associated with the ray generation shader execution.

It should be understood that many variations are possible based on the disclosure herein. Although features and elements are described above in particular combinations, each feature or element can be used alone without the other features and elements or in various combinations with or without other features and elements. In an example, while it is sometimes described herein that an any hit shader can spawn new rays (e.g., triggering a ray trace operation), in some implementations, an any hit shader does not spawn new rays due to such activity not being technically feasible.

In another example, the technique for scheduling operations via the command processor 137 may be used for operations other than ray tracing operations. In such an example, the pseudo-code of Table 1 would be modified such that the shaders launched are any type of shader (not just shaders for ray tracing). For example, instead of a ray generation shader, a base shader would be launched, and would trigger other parts of the orchestration. In addition, the pseudo-code of Table 1 would be modified such that at least one type of such shader program would set a "next recursion level" flag, which would be analogous to the trace flag. The next recursion level flag would cause a next recursion level shader to execute. Any shader, including the next recursion level shader, is capable of placing one or more shader entries into the shader queue. In any iteration loop, detecting that execution of the next recursion level shader is to occur (analogous to detecting that the HasTrace flag is set) would cause the recursion depth to increment, up to the max recursion level. The above operations could be used to implement any pipeline in which shaders can call other shaders, as with the ray tracing pipeline of FIG. 3.

The various functional units illustrated in the figures and/or described herein (including, but not limited to, the processor 102, the input driver 112, the input devices 108, the output driver 114, the output devices 110, the accelerated processing device 116, the command processor 137, the graphics processing pipeline 134, the compute units 132, the SIMD units 138, the ray tracing pipeline 300, the ray generation shader 302, the ray trace stage 304, the any hit shader 306, the closest hit shader 310, the miss shader 312, the pipeline orchestration logic 410, or the shader queue 404) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing shader operations, the method comprising:
   in a first loop iteration at a base recursion depth of a ray tracing operation, launching a base shader that requests a ray trace;
   in the first loop iteration, in response to the request of the ray trace, executing the ray trace to place an entry into a first portion of a shader queue, wherein the first portion of the shader queue is associated with a second recursion depth of the ray tracing operation that is subsequent to the base recursion depth, wherein the entry indicates at least one shader to be launched at the second recursion depth;
   in a second loop iteration, in response to the base shader requesting the ray trace, traversing to the second recursion depth; and
   in response to the at least one shader being in the first portion of the queue that is associated with the second recursion depth, executing the at least one shader.

2. The method of claim 1, wherein:
   the shader operations comprise ray tracing operations;
   the base shader comprises a ray generation shader; and
   the next recursion level shader comprises a trace ray operation.

3. The method of claim 1, wherein the base shader specifies one or more shaders to be launched in response to the next recursion level shader.

4. The method of claim 1, wherein the next recursion level shader is configured to place one or more shader entries into the shader queue at a recursion depth higher than the recursion depth of the base shader.

5. The method of claim 1, further comprising:
   in the second loop iteration, executing one or more shaders specified by the base shader.

6. The method of claim 5, wherein executing the one or more shaders comprises identifying one or more shaders in a shader queue at a recursion depth equal to one plus the base recursion depth; and executing the identified one or more shaders.

7. The method of claim 1, further comprising:
   in the second loop iteration, or a loop iteration after the second loop iteration, detecting that no shader program executed in that loop iteration requests a next recursion level shader be executed; and
   in response to the detecting, decrementing the current recursion depth.

8. The method of claim 1, further comprising:
   after one or more loop iterations, detecting that the current recursion depth is below a threshold; and
   ending the loop in response to the detecting.

9. The method of claim 1, further comprising:
   in the second loop iteration, or a loop iteration after the second loop iteration, detecting that a shader executed at that loop iteration requested a next recursion level shader be executed; and
   in response to the detecting, setting the current recursion depth to be the lesser of the maximum recursion depth and the current recursion depth incremented by one.

10. The method of claim 1, wherein:
    the base shader is configured to add a shader entry to a shader queue at the base recursion depth, the shader entry corresponding to a remaining portion of the base shader.

11. A command processor, comprising:
    a shader queue; and
    circuitry configured to performing shader operations, by:
       in a first loop iteration at a base recursion depth of a ray tracing operation, launching a base shader that requests a ray trace;
       in the first loop iteration, in response to the request of the ray trace, executing the ray trace to place an entry into a first portion of a shader queue, wherein the first portion of the shader queue is associated with a second recursion depth of the ray tracing operation that is subsequent to the base recursion depth wherein the entry indicates at least one shader to be launched at the second recursion depth; and
       in a second loop iteration, in response to the base shader requesting the ray trace, traversing to the second recursion depth; and
       in response to the at least one shader being in the first portion of the queue that is associated with the second recursion depth, executing the at least one shader.

12. The command processor of claim 11, wherein:
    the shader operations comprise ray tracing operations;
    the base shader comprises a ray generation shader; and
    the next recursion level shader comprises a trace ray operation.

13. The command processor of claim 11, wherein the base shader specifies one or more shaders to be launched in response to the next recursion level shader.

14. The command processor of claim 11, wherein the next recursion level shader is configured to place one or more shader entries into the shader queue at a recursion depth higher than the recursion depth of the base shader.

15. The command processor of claim 11, wherein the pipeline orchestration unit is further configured to:
    in the second loop iteration, execute one or more shaders specified by the base shader.

16. The command processor of claim 15, wherein executing the one or more shaders comprises identifying one or more shaders in a shader queue at a recursion depth equal to one plus the base recursion depth; and executing the identified one or more shaders.

17. The command processor of claim 11, wherein the pipeline orchestration unit is further configured to:
    in the second loop iteration, or a loop iteration after the second loop iteration, detect that no shader program executed in that loop iteration requests a next recursion level shader be executed; and
    in response to the detecting, decrement the current recursion depth.

18. The command processor of claim 11, wherein the pipeline orchestration unit is further configured to:
    after one or more loop iterations, detect that the current recursion depth is below a threshold; and
    end the loop in response to the detecting.

19. The command processor of claim 11, wherein the pipeline orchestration unit is further configured to:
    in the second loop iteration, or a loop iteration after the second loop iteration, detect that a shader executed at that loop iteration requested a next recursion level shader be executed; and in response to the detecting, set the current recursion depth to be the lesser of the maximum recursion depth and the current recursion depth incremented by one.

20. The command processor of claim 11, wherein the circuitry comprises a pipeline orchestration unit.

21. A non-transitory computer-readable medium storing instructions that, when executed by a processor, cause the processor to:
   in a first loop iteration at a base recursion depth of a ray tracing operation, launch a base shader that requests a ray trace;
   in the first loop iteration, in response to the request of the ray trace, executing the ray trace to place an entry into a first portion of a shader queue, wherein the first portion of the shader queue is associated with a second recursion depth of the ray tracing operation that is subsequent to the base recursion depth, wherein the entry indicates at least one shader to be launched at the second recursion depth; and
   in a second loop iteration, in response to the base shader requesting the ray trace, traversing to the second recursion depth; and
   in response to the at least one shader being in the first portion of the queue that is associated with the second recursion depth, executing the at least one shader.

* * * * *